US008677383B2

(12) United States Patent
Zehner

(10) Patent No.: US 8,677,383 B2
(45) Date of Patent: Mar. 18, 2014

(54) RADIO FREQUENCY TRANSPONDER FOR USE WITH A MEDIUM

(75) Inventor: William John Zehner, Camarillo, CA (US)

(73) Assignee: Thomson Licensing, Boulogne-Billancourt (FR)

(*) Notice: Subject to any disclaimer, the term of this patent is extended or adjusted under 35 U.S.C. 154(b) by 658 days.

(21) Appl. No.: 12/308,541

(22) PCT Filed: Aug. 14, 2006

(86) PCT No.: PCT/US2006/031736
§ 371 (c)(1),
(2), (4) Date: Dec. 17, 2008

(87) PCT Pub. No.: WO2008/005028
PCT Pub. Date: Jan. 10, 2008

(65) Prior Publication Data
US 2011/0194399 A1    Aug. 11, 2011

Related U.S. Application Data

(60) Provisional application No. 60/817,751, filed on Jun. 30, 2006.

(51) Int. Cl.
*G11B 7/26* (2006.01)

(52) U.S. Cl.
USPC .......................... 720/718; 340/572.7; 369/273

(58) Field of Classification Search
CPC ............ G11B 7/252; G11B 7/26; G11B 7/24; G11B 2220/23; G11B 2220/2537; G11B 23/0042

USPC ................. 340/572.1, 572.7, 572.8; 369/273; 720/718; 235/454, 488, 492

See application file for complete search history.

(56) References Cited

U.S. PATENT DOCUMENTS

| 6,542,444 | B1 * | 4/2003 | Rutsche ........................ 369/14 |
| 6,775,839 | B1 | 8/2004 | O'Brien |
| 6,902,111 | B2 | 6/2005 | Han et al. |
| 6,984,433 | B2 * | 1/2006 | Usami et al. .................. 428/64.1 |
| 7,280,043 | B2 * | 10/2007 | Tsen et al. .................. 340/572.1 |
| 7,292,147 | B2 * | 11/2007 | Benedikt .................... 340/572.7 |
| 7,378,972 | B2 * | 5/2008 | Kai et al. ................... 340/572.7 |
| 7,382,254 | B2 * | 6/2008 | Posamentier ............. 340/572.1 |

(Continued)

FOREIGN PATENT DOCUMENTS

| CA | 2165235 | 6/1997 |
| EP | 1168239 | 1/2002 |

(Continued)

OTHER PUBLICATIONS

International Search Report dated Nov. 26, 2007.

*Primary Examiner* — Will J Klimowicz
(74) *Attorney, Agent, or Firm* — Robert D. Shedd; Robert B. Levy

(57) ABSTRACT

A radio frequency transponder for use with a disc, such as a CD or DVD has an antenna formed by depositing a conductive solution on a surface of disc outside at adjacent to its outer periphery outside of the disc storage area to yield at least one conductive region. A transponder circuit is coupled to the antenna for supplying an RF signal to the antenna in response to a signal received from the antenna.

7 Claims, 3 Drawing Sheets

(56) References Cited

U.S. PATENT DOCUMENTS

| | | | |
|---|---|---|---|
| 7,443,299 B2 * | 10/2008 | Forster | 340/572.7 |
| 2002/0097664 A1 | 7/2002 | Ono et al. | |
| 2003/0063001 A1 | 4/2003 | Hohberger et al. | |
| 2003/0151028 A1 | 8/2003 | Lawrence et al. | |
| 2004/0052202 A1 | 3/2004 | Brollier | |
| 2004/0052203 A1 | 3/2004 | Brollier | |
| 2004/0175548 A1 | 9/2004 | Lawrence et al. | |
| 2004/0236701 A1 | 11/2004 | Beenau et al. | |
| 2005/0038823 A1 | 2/2005 | Wade et al. | |
| 2005/0218219 A1 | 10/2005 | Sano et al. | |
| 2005/0265211 A1 * | 12/2005 | Nakane et al. | 369/275.1 |
| 2006/0028344 A1 * | 2/2006 | Forster | 340/572.7 |
| 2006/0067187 A1 | 3/2006 | Yang et al. | |
| 2006/0174353 A1 | 8/2006 | Ryal | |
| 2006/0250244 A1 * | 11/2006 | Tsen et al. | 340/572.1 |
| 2009/0052309 A1 * | 2/2009 | Hoffman | 369/273 |
| 2009/0196158 A1 * | 8/2009 | Vast et al. | 369/275.3 |

FOREIGN PATENT DOCUMENTS

| | | |
|---|---|---|
| EP | 1598815 | 11/2005 |
| GB | 2407094 | 4/2005 |
| JP | 11353714 A * | 12/1999 |
| JP | 2000132871 | 5/2000 |
| JP | 2002111368 | 4/2002 |
| JP | 2003085502 | 3/2003 |
| JP | 2003199155 | 7/2003 |
| JP | 2004334268 | 11/2004 |
| JP | 2005032392 A * | 2/2005 |
| JP | 2005190514 A * | 7/2005 |
| JP | 2006031675 | 2/2006 |
| JP | 2006092630 A * | 4/2006 |
| JP | 2006107658 | 4/2006 |
| KR | 20050011592 | 1/2005 |
| KR | 20050035992 | 4/2005 |
| WO | WO9606409 | 2/1996 |
| WO | WO0248980 | 6/2002 |
| WO | WO0250905 | 6/2002 |
| WO | WO03092173 | 11/2003 |
| WO | WO 2004097731 A2 * | 11/2004 |
| WO | WO2004099821 | 11/2004 |
| WO | WO 2004107261 A1 * | 12/2004 |
| WO | WO2005062388 | 7/2005 |
| WO | WO2005091434 | 9/2005 |
| WO | WO2006021938 | 3/2006 |
| WO | WO2008000991 | 1/2008 |

* cited by examiner

RADIO FREQUENCY TRANSPONDER FOR USE WITH A MEDIUM

CROSS-REFERENCE TO RELATED APPLICATIONS

This application claims the benefit, under 35 U.S.C. §365 of International Application PCT/US2006/031736 filed Aug. 14, 2006, which was published in accordance with PCT Article 21(2) on Jan. 10, 2008 in English and claims priority of U.S. Provisional Application No. 60/817,751 filed Jun. 30, 2006, the teachings of which are herein incorporated by reference in its entirety.

TECHNICAL FIELD

This invention relates to the combination of a radio frequency antenna and a transponder circuit for use on storage medium, such as a digital video disc (DVD) or computer disc (CD).

BACKGROUND ART

Many industrial and commercial electronic article surveillance applications make use of a radio frequency transponder for detecting and identifying an article of interest. A typical radio frequency (RF) transponder for use in such applications comprises an antenna coupled to an electronic circuit carried on a substrate. In response to an interrogation signal received by the antenna, the electronic circuit generates a response transmitted by the antenna for receipt at a base station. The presence and characteristics of the response signal indicate the presence and nature, respectively, of the article that carries the RF transponder.

RF transponders of the type described above have proliferated in the retail environment for use in theft detection. Many different types of articles presently carry a transponder circuit which a store clerk will deactivate after purchase by the customer. However, should someone try and remove steal the article without purchase (and deactivation of the transponder), the transponder on the article will respond to a signal from a theft detection system. The response from the RF transponder on the article causes the theft detection system to generate an alarm so that store security can apprehend the would-be thief before leaving the store. Because of the effectiveness of RF transponders for theft detection, many large retailers now require their vendors to provide such transponders on articles for sale.

Presently, RF transponders of the type used for article surveillance exist in various forms. One popular type of transponder comprises an adhesive tag that includes the antenna and circuit in a single package for adhering to an article. Other arrangements include a separate antenna, usually in the form of a thin conductive Mylar® film glued or otherwise attached to the article, for connection to a small semiconductor chip containing the transponder circuit. Unfortunately, RF transponders of the type currently available are not well suited for certain kinds of articles, especially CD and DVD discs. Adhesive tag-type RF transponder circuits, when attached to the top surface of a CD or DVD disc can upset the overall disc balance during use. Moreover, placing an adhesive tag-type RF transponder on the top surface of a disc will detract from the artwork printed on the disc. Also, placing this type of RF transponder on the top surface of a CD or DVD so as to be entirely visible readily increases the likelihood that a would-be thief will attempt to disable the RF transponder to facilitate disc theft.

Another type of RF transponder currently marketed for use with CD and DVDs consists of a pair of half-circular conductive Mylar® arcs glued to the periphery of the disc for attachment at opposing ends to a chip containing a transponder circuit. This arrangement suffers from several disadvantages. First, the cost of this type of RF transponder relative to the cost of the manufacture of the disc is significant, making this type of transponder expensive, if not cost prohibitive. Second, applying each of the Mylar® arcs to the disc will likely prove difficult in a conventional disc manufacturing environment.

Thus, there is need for a RF transponder especially suited for use on a disc such as a DVD or CD.

BRIEF SUMMARY OF THE INVENTION

Briefly, in accordance with the present principles, there is provided a RF transponder circuit for use on a storage medium, such as a disc (e.g., a CD or DVD for example). The RF transponder comprises an antenna formed by depositing a conductive solution on a surface of the disc outside of the storage region to yield at least one conductive portion capable of receiving and radiating RF energy. A transponder circuit is coupled to the antenna for supplying an RF signal to the antenna in response to a signal received at the antenna, such as from an external base station.

Providing the antenna outside the storage region, typically in the non-metallized annular region of a CD or DVD disc, affords the advantage of enabling more reliable reading each of a plurality of discs in a stack which has heretofore been difficult when the antenna lies inside the storage region on the disc.

DETAILED DESCRIPTION

Figure 1:
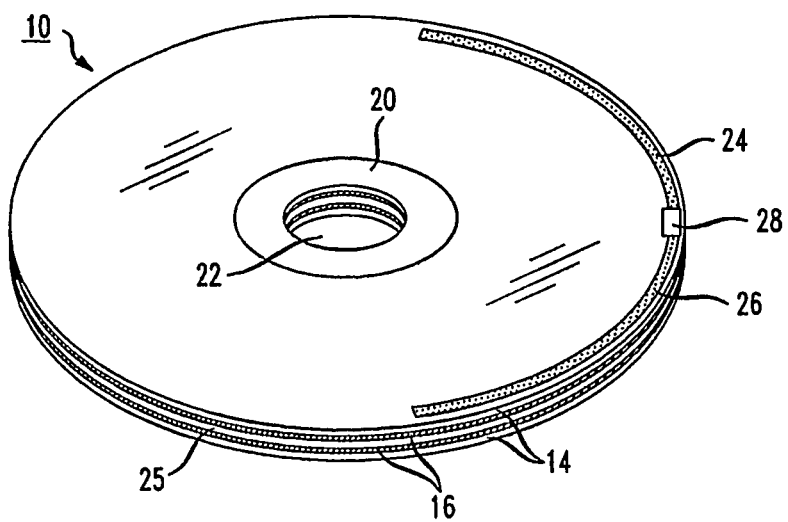
FIG. 1 illustrates a front view in perspective of a disc embodying an RF transponder in accordance with a preferred embodiment of the invention.
Figure 2:
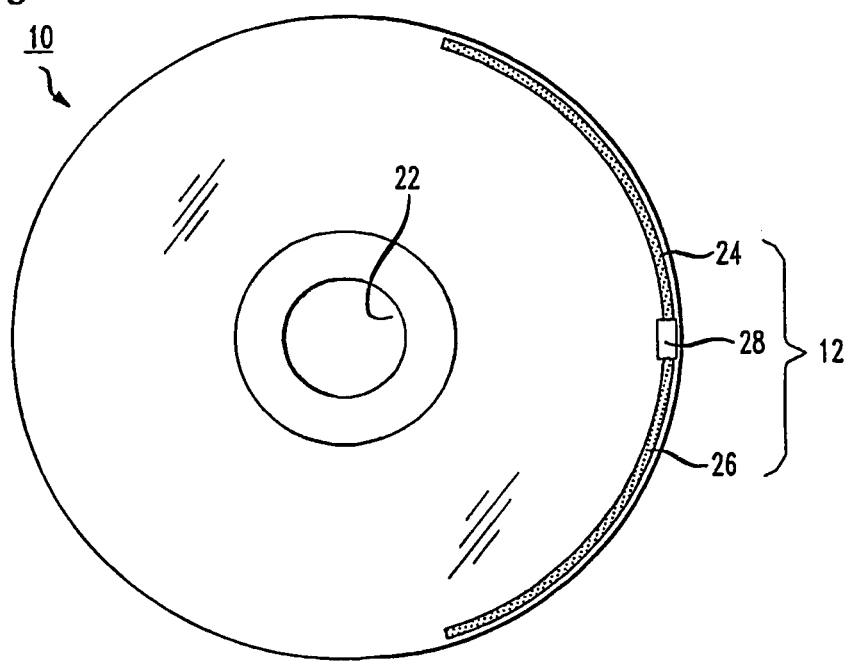
FIG. 2 illustrates a top view of the disc of FIG. 1.

FIGS. 1 and 2 illustrate a front view in perspective, and a top view, respectively, of a storage medium 10 embodying an RF transponder 12 (best seen in FIG. 2) in accordance with a preferred embodiment of the present principles. The storage medium 10 illustratively takes the form of an optical disc such as a CD or DVD comprised of one or more annular substrates 14, each having a recorded layer 16 formed on a major surface in spaced relationship with the recorded layer on the other substrate. Each substrate 14 typically comprises a layer of plastic formed by injection molding to create a pattern of pits (not shown) in one of its major surfaces. A metal coating, typically aluminum or an alloy of one or more metals such as gold, silver, copper, zinc, and aluminum for example covers the pits on each substrate, thereby forming the record layer 16. The arrangement of the metal coated pits defines the data carried on the corresponding substrate 14. In practice, the metallization forming the record layer 16 on each substrate lies outside of an annular region 20 that surrounds an opening 22 at the center of each substrate. The metallization of each record layer 16 extends just short of the periphery of its associated substrate 14 so as to leave a non-metallized region adjacent to periphery of each substrate, as illustrated by the non-metallized region 24 shown in FIG. 2 adjacent to the periphery of the upper-most substrate 14.

An adhesive/spacer layer 25 serves to attach the substrates 14 in face-to-face relationship with each other to yield the disc 10 such that the record layers 16 both face the same direction (e.g., downward in FIG. 1). The opening 22 in each substrate 14 facilitates alignment with the other substrate. Moreover, the opening 22 can receive a spindle (not shown) to enable stacking of a plurality of discs for storage and handling.

As best illustrated in FIG. 2, the RF transponder 12 comprises the combination of an antenna 26 coupled to a transponder circuit 28. The transponder circuit 28 typically takes the form of a semiconductor chip or the like which contains various components which in combination enable the chip to receive an RF signal via the antenna 26 and in response, generate a RF signal radiated by the antenna. The construction and operation of the transponder circuit 26 is well known.

In the illustrative embodiment of FIG. 2, the antenna 26 comprises a conductive solution deposited on the non-metallized region 24 of the upper surface 30 of the disc 10, (i.e., the upper surface of the upper substrate 14), that that normally carries the artwork or other indicia identifying the disc (not shown). In the preferred embodiment, the antenna 26 takes the form of a dipole having opposed radiators formed by depositing the conductive solution in two strips adjacent to the periphery of the disc. While other types of antennas are possible, the use of a dipole simplifies disc construction.

Typically, the conductive solution used to form the antenna 26 comprises a conductive ink printed on the upper surface 30 of the disc 10, typically in conjunction with printing the artwork and/or other descriptive indicia on that surface. For example, the antenna 26 could comprise a layer of silver formed by printing a silver ink comprised of silver particles suspended in a solvent. Once the solvent dries, the silver particles will form a conductive layer for receiving and transmitting RF signals. Other types of conductive inks or conductive materials, such as a conductive gel could also serve to form the antenna 26.

Forming the antenna on the upper disc surface 30 during printing of the artwork on the disc 10 serves to minimize the number of manufacturing operations needed, to create the disc 10 with the embodied RF transponder 12. Moreover, the equipment (not shown) that serves to print the artwork on the disc can readily be adapted to print the antenna 26. Using the same equipment to print the antenna 26 also helps reduce manufacturing costs.

Forming the antenna 26 by depositing a conductive solution on the non-metallized region 24 so that the antenna lies outside the storage area on the disc 10 (i.e., the antenna lies outside the metallization on each of the record layers 16) affords a distinct advantage in terms of the ability transponder circuit 26 to receive and transmit signals. As discussed in greater detail below, the metal coating forming each record layer 16 will adversely affect RF signals received by and transmitted from the antenna 26. Locating the antenna 26 within the area occupied by the record layer 16 on each substrate (i.e., the data storage area) has been found to adversely impact antenna radiation as compared to locating the antenna within the non-metallized region 24. Thus, locating the antenna 26 outside of the data storage area allows for better signal reception by and from the transponder 12, thus allowing signal reception by and from the transponder 12 on each of a plurality of discs 10 stacked adjacent to each other.

Figure 3:
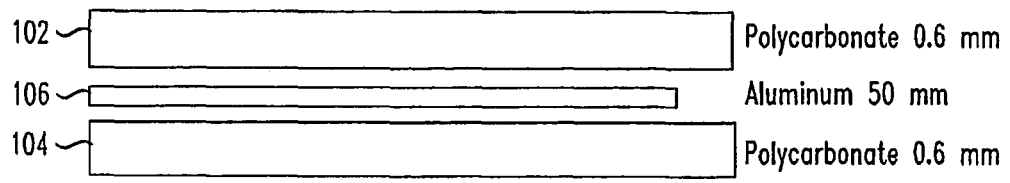
FIG. 3 illustrates simplified disc structure used for simulating radiation patterns for the RF transponder of FIG. 1.

To appreciate the affect the affect that metallization can have on the antenna a simulation was performed using a three-layer disc structure 100 of FIG. 3 composed of a pair of polycarbonate layers 102 and 104, respectively separated by an aluminum layer of 106. Each of the polycarbonate layers 102 and 104 has an outer diameter of 120 mm and thickness of 0.6 mm, with the material properties of the polycarbonate being such that $Er=2.8$ and $Tan\ delta=e^{-4}$. The aluminum layer 106 has a thickness of 50 nm and a conductivity of 38000000 Siemens/meter. The disc structure 100 of FIG. 3 includes a transponder (not shown) of the type described in FIGS. 1 and 2, with its antenna formed of a conductive solution deposited on the upper surface of the upper polycarbonate layer 102 so as to lie outside (to the left) of the left-hand most edge of the aluminum layer 106.

Figure 4:
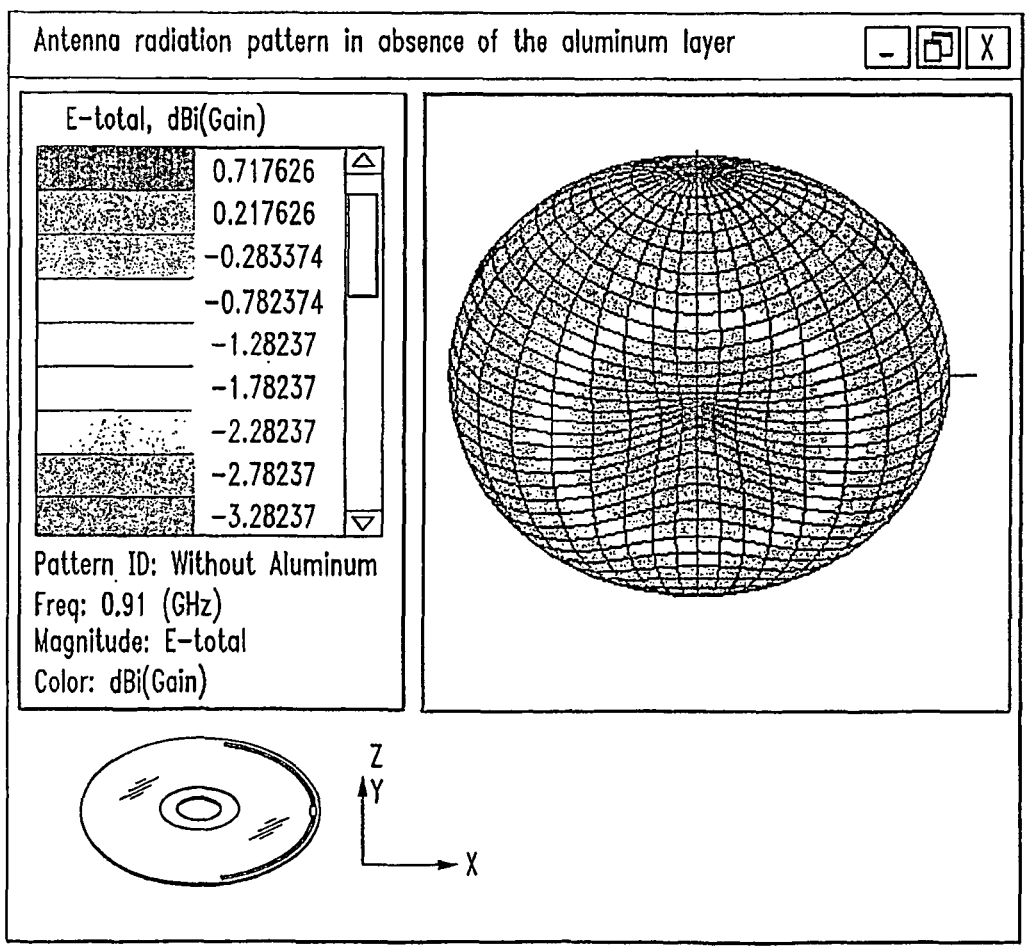
FIG. 4 illustrates a simulated pattern of the radiation expected to be emitted by RF transponder of FIG. 1 when incorporated in the disc structure of FIG. 3 in the absence of aluminum on the middle layer.

FIG. 4 depicts a radiation pattern for the antenna of the transponder carried by the disc structure 100 of FIG. 3 in the absence of the aluminum layer 106 for a frequency of 0.91 GHz. As can be appreciated from FIG. 4, in the absence of the aluminum layer 10, the antenna of transponder carried by the disc structure of FIG. 3 exhibit radiation pattern consistent with a that exhibited by a classical dipole antenna.

Figure 5:
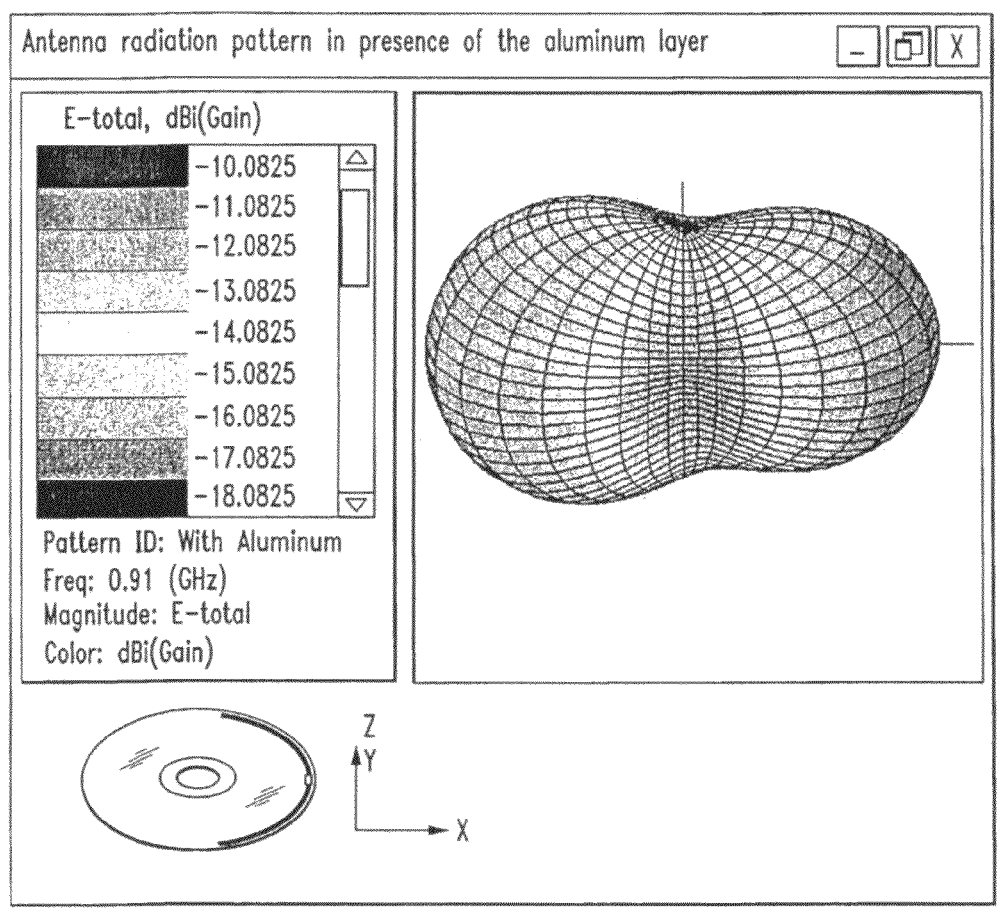
FIG. 5 illustrates a simulated pattern of the radiation expected to be emitted by RF transponder of FIG. 1 when incorporated in the disc structure of FIG. 3 in the presence of aluminum on the middle layer.

FIG. 5 depicts the radiation pattern for the antenna of the transponder carried by the disc structure 100 of FIG. 3 with the aluminum layer 106 present. In comparison to the radiation pattern of FIG. 4, the radiation pattern of FIG. 5 shows some distortion due to the presence of the aluminum layer, despite the location of the antenna of the transponder outside of the aluminum layer. Much greater distortion would be expected if the antenna of the transponder were placed within the area of the aluminum layer 106, thus suggesting that if an antenna of transponder were located within the metallized storage area of a DVD or CD, transponder performance would be greatly impacted.

The foregoing describes a RF transponder for use in combination with a storage medium such as a CD or DVD.

The invention claimed is:

1. A method of providing a radio frequency (RF) transponder circuit on a medium containing a storage area with metallization, comprising the steps of:
    forming an antenna on the medium by depositing a conductive solution on a surface of a non-metallized region of the medium both outside of the storage area and adjacent to an outermost periphery of the medium to yield at least one conductive region, wherein the forming is performed in conjunction with printing, on said surface, at least one of artwork and descriptive indicia; and
    coupling a transponder circuit to the antenna for supplying an RF signal to the antenna in response to a signal received from the antenna.

2. The method according to claim 1 wherein the medium comprises one of a CD or DVD.

3. The method according to claim 1 wherein step of forming the antenna further comprises printing a conductive ink.

4. The method according to claim 3 wherein the conductive ink contains silver.

5. The method according to claim 1, wherein the forming of the antenna is performed by depositing the conductive solution using screen printing.

6. The method according to claim 1, further comprising forming the antenna during the printing of the at least one of artwork and descriptive indicia.

7. The method according to claim 1, further comprising forming the antenna using an equipment that is same as that for the printing of at least one of artwork and descriptive indicia.

* * * * *